United States Patent [19]

Robertson

[11] Patent Number: 5,786,820
[45] Date of Patent: Jul. 28, 1998

[54] METHOD AND APPARATUS FOR INCREASING THE DISPLAYED DETAIL OF A TREE STRUCTURE

[75] Inventor: George G. Robertson, Foster City, Calif.

[73] Assignee: Xerox Corporation, Stamford, Conn.

[21] Appl. No.: 710,827

[22] Filed: Sep. 23, 1996

Related U.S. Application Data

[63] Continuation of Ser. No. 282,848, Jul. 28, 1994, abandoned.

[51] Int. Cl.$^6$ ............................................. G06T 3/00
[52] U.S. Cl. ..................................... 345/357; 345/355
[58] Field of Search ............................ 395/355, 356, 395/357, 326, 339, 341, 342, 140, 133, 119; 345/355, 356, 357, 326, 339, 341, 342, 440, 433, 419

[56] References Cited

U.S. PATENT DOCUMENTS

| | | | |
|---|---|---|---|
| 4,528,585 | 7/1985 | Bolger | 348/580 |
| 4,613,946 | 9/1986 | Forman | 345/356 |
| 4,649,499 | 3/1987 | Sutton et al. | 345/419 |
| 4,685,070 | 8/1987 | Flinchbaugh | 345/424 |
| 4,710,763 | 12/1987 | Franke et al. | 345/10 |
| 4,742,558 | 5/1988 | Ishibashi et al. | 345/240 |
| 4,752,889 | 6/1988 | Rappaport et al. | 395/12 |
| 4,764,867 | 8/1988 | Hess | 345/356 |
| 4,772,882 | 9/1988 | Mical | 345/146 |
| 4,807,158 | 2/1989 | Blanton et al. | 345/425 |
| 4,808,987 | 2/1989 | Takeda et al. | 345/115 |
| 4,821,211 | 4/1989 | Torres | 345/357 |
| 4,858,149 | 8/1989 | Quarendon | 345/425 |
| 4,931,783 | 6/1990 | Atkinson | 345/163 |
| 4,953,106 | 8/1990 | Gansner et al. | 345/440 |
| 4,974,173 | 11/1990 | Stefik et al. | 345/331 |
| 4,974,174 | 11/1990 | Kleinman | 345/433 |
| 4,982,344 | 1/1991 | Jordan | 345/346 |
| 5,021,976 | 6/1991 | Wexelblat et al. | 345/356 |
| 5,065,347 | 11/1991 | Pajak et al. | 345/348 |
| 5,072,412 | 12/1991 | Henderson et al. | 345/346 |
| 5,103,217 | 4/1992 | Cawley | 345/429 |
| 5,146,555 | 9/1992 | Kiyohara | 345/342 |
| 5,155,806 | 10/1992 | Hoeber et al. | 345/338 |
| 5,224,209 | 6/1993 | Hirai et al. | 345/354 |
| 5,230,063 | 7/1993 | Hoeber et al. | 345/354 |
| 5,237,651 | 8/1993 | Randall | 345/350 |
| 5,276,789 | 1/1994 | Besaw et al. | 345/440 |
| 5,295,243 | 3/1994 | Robertson et al. | 345/348 |

(List continued on next page.)

FOREIGN PATENT DOCUMENTS

| | | | |
|---|---|---|---|
| 260144A2 | 3/1988 | European Pat. Off. | G06F 15/62 |
| 309374A2 | 3/1989 | European Pat. Off. | G06F 15/20 |
| 319232A2 | 6/1989 | European Pat. Off. | G06F 15/40 |
| 352741A2 | 1/1990 | European Pat. Off. | G09G 1/00 |
| 353952A2 | 2/1990 | European Pat. Off. | G06F 15/72 |
| 435601A2 | 7/1991 | European Pat. Off. | H04N 1/387 |
| 447095A2 | 9/1991 | European Pat. Off. | G06F 15/72 |
| 535986A2 | 4/1993 | European Pat. Off. | G06F 3/033 |
| 323302A1 | 7/1989 | Japan | G06F 15/72 |
| 2139846 | 3/1984 | United Kingdom | H04N 1/02 |
| A-2187580 | 9/1987 | United Kingdom | G06F 15/14 |

OTHER PUBLICATIONS

MacPaint Manual, Apple Computer, Inc., pp. 1–11, 14–32, 1986.

(List continued on next page.)

*Primary Examiner*—Matthew M. Kim
*Assistant Examiner*—Crescelle N. dela Torre
*Attorney, Agent, or Firm*—Richard B. Domingo

[57] ABSTRACT

A method and apparatus for increasing the displayed detail of a tree structure. The present invention is for use on a computer controlled display system and provides for visualization of a tree structure so that a greater amount of the detail of the tree structure may be displayed in a display area. In the present invention, a tree structure is warped about an arbitrary surface for display. Such an arbitrary surface would include a surface defined by a parabola, a hyperbola or by the intersection of two lines. As a result, an increased number of nodes in each level of the tree can be displayed.

21 Claims, 8 Drawing Sheets

U.S. PATENT DOCUMENTS

| | | | |
|---|---|---|---|
| 5,333,254 | 7/1994 | Robertson | 345/356 |
| 5,339,390 | 8/1994 | Robertson et al. | 345/342 |
| 5,432,897 | 7/1995 | Tatsumi et al. | 345/440 |
| 5,450,535 | 9/1995 | North | 345/440 |
| 5,469,539 | 11/1995 | Usuda | 345/353 |
| 5,515,486 | 5/1996 | Amro et al. | 345/437 |
| 5,515,488 | 5/1996 | Hoppe et al. | 345/440 |
| 5,546,529 | 8/1996 | Bowers et al. | 345/348 |

OTHER PUBLICATIONS

Wilson, Kathleen S., "Palenque: An Interactive Multimedia Optical Disc Prototype for Children," Center for Children and Technology, Bank Street College of Education, New York, Working Paper No. 2, Mar. 1987, pp. 1–8.

In Large Brochure, Berkeley Systems, Inc., Berkeley, California, 1989.

EPO Communication, May 28, 1996; European Search Report and Annex, Application No. EP 93 30 5051.

Chignell, M.H., et al., "An Exploration in the Design Space of Three Dimensional Hierarchies", *Proceedings of the Human Factors and Ergonomics Society 37 Annual Meeting*, Oct. 11–15, 1993, vol. 1, pp. 333–337.

Robertson, G.G., et al., "Information Visualization Using 3D Interactive Animation," *Communications of the ACM*, Apr. 1993, vol. 36, No. 4, pp. 57–71.

Koike, H., "The Role of Another Spatial Dimension in Software Visualization," *ACM Transactions on Information Systems*, Jul. 1993, vol. 11, No. 3, pp. 266–286.

Cahn, D., "A PHIGS Technical Overview," *Using the PHIGS Standard*, Sigraph '87, Anaheim, California, Jul. 27–31, 1987, pp. 73–110.

Fairchild, K.M., Poltrock, S.E., and Furnas, G.W., "SemNet: Three–Dimensional Graphic Representations of Large Knowledge Bases," in Guindon, R., Ed., Cognitive Science and its Application for Human Computer Interaction, Lawrence Erlbaum, Hillsdale, New Jersey, 1988, pp. 201–233.

Smith, A.R., "Plants, Fractuals, and Formal Languages," in Computer Graphics, vol. 18, No. 3, Jul. 1984.

Thessman, T., "Casting Shadows on Flat Surfaces," IRIS Universe, Winter 1989, pp. 16 and 18–19.

Robertson, G.G., Card, S.K., and Mackinlay, J.D., "The Cognitive Coprocessor Architecture for Interactive User Interfaces," Proceedings of the ACM SIGGRAPH Symposium on User Interface Software and Technology, Williamsburg, Virginia, Nov. 13–15, 1989, pp. 10–18.

Pope, S.T., Goldberg, A., and Leibs, D., "The ParcPlace Systems Navigator Applications and Frameworks," presented at ACM SigGraph Symposium on User Interface Software, Oct. 1988, Banff, Canada, pp. 1–30.

Furnas, G.W., "Generalized Fisheye Views," CHI '86 Proceedings, ACM, Apr. 1986, pp. 16–23.

Feiner, Steven et al., "An Experiment System for Creating and Presenting Interactive Graphical Documents," *ACM Transactions on Graphics*, vol. 1, No. 1, Jan. 1982, pp. 59–77.

Sutherland, I.E., "Sketchpad—A Man–Machine Graphical Communication Systems," AFIPS Spring Joint Computer Conference, vol. 23 (1963) pp. 329–346.

Bolt, R.A., *The Human Interface*, Lifetime Learning Publications, Belmont, California, 1984, pp. 8–34.

Herot, C.F., "Spatial Management of Data," *ACM Trans. on Database Systems*, vol. 5, No. 4, (Dec. 1980), pp. 493–514.

Beier, T. and Neely, S., "Feature–Based Image Metamorphosis," *Computer Graphics*, 25, 2, Jul. 1992, pp. 35–42.

Wolberg, G., *Digital Image Warping*, IEEE Computer Society Press, Los Alamitos, California, 1990, pp. 1–10, 222–240, and 301–314.

Farrand, W.A., "Information Display in Interactive Design," Doctoral Thesis, University of California Los Angeles 1973.

Nielsen, "The Art of Navigating Through Hypertext," Mar. 1990, Communications of the ACM, pp. 297–310.

Dalton, R., "Beyond Bifocals: Help for tired eyes," *Lotus*, vol. 4, No. 10, Oct. 1988, pp. 17–18.

Edel, M., "The Tinkertoy Graphical Programming Environment," IEEE Transactions on Software Engineering, Aug. 1988, pp. 1110–1115.

Halasz, F.G., Moran, T.P., and Trigg, R.H., "NoteCards in a Nutshell," in Proceedings of CHI + GI 1987 (Toronto, Apr. 5–9, 1987), ACM, New York, 1987, pp. 45–52.

Spence, R. and Apperley, M., "Data Base Navigation: An Office Environment for the Professional," Behaviour and Information Technology, vol. 1, No. 1, 1982, pp. 43–54.

| Pointer To Parent Node 401 | Pointers To Child Nodes 402 | Node Information 403 | Layout Address 404 |

METHOD AND APPARATUS FOR INCREASING THE DISPLAYED DETAIL OF A TREE STRUCTURE

This is a continuation of application Ser. No. 08/282,848, filed Jul. 28, 1994 now abandoned.

FIELD OF THE INVENTION

The present invention relates generally to the field of information display, and in particular to the display of hierarchical information structures.

BACKGROUND OF THE INVENTION

It is well understood that information visualizations provide insights to the underlying data. For example, for any given set of information, new information regarding patterns or relationships can be obtained by looking at attributes of the information. It is often useful to view the attributes of the information in a hierarchical structure. However, a difficulty lies in displaying large hierarchical structures in a limited display area.

EP 0 435 601 A2, entitled "Display of Hierarchical Three-Dimensional Structures", Robertson, et al., which is assigned to the assignee of the present invention discloses a technique for displaying and manipulating three-dimensional representations of a tree structure which have rotating substructures.

U.S. Pat. No. 4,752,889, entitled "Dynamic, Interactive Display System For A Knowledge Base", Rapport, et al., describes a graphic display that shows links between chunks of knowledge. The user, with mouse clicks, can obtain a display of links from a displayed chunk of knowledge to other chunks of knowledge, which are added to the display. Screen scrolling mechanisms allow movement from one area of the overall graph to another.

EP 0 535 986 A2, entitled "Method of Operating A Processor", Robertson, which is assigned to the assignee of the present invention describes a method for centering a selected node of a node link structure along a centering line. The nodes are in rows, and each row extends across a centering line with links between nodes in adjacent rows. When a user requests a centering operation for an indicated node, a sequence of images is presented, each including a row that appears to be a continuation of the row with the indicated node and that includes a continued indicated node that appears to be a continuation of the indicated node. The rows appear to be shifted, bringing the continued indicated nodes toward the centering line, until a final shift locks the continued indicated node into position at the centering line. The positions of the indicated node and a subset of the continued indicated nodes together can define an asymptotic path that begins at the position of the indicated node and approaches the center line asymptotically until the final shift occurs. The displacements between positions can follow a logarithmic function, with each displacement being a proportion of the distance from the preceding position to the centering line. Each node can be rectangular, and the nodes in each row can be separated by equal offsets to provide compact rows. Each node can be a selectable unit, so that the user can request a centering operation by selecting a node, such as with a mouse click.

Furnas, G. W., "Generalized Fisheye Views," CHI '86 Proceedings, ACM, April 1986, pp. 16–23, describes fisheye views that provide a balance of local detail and global context. Section 1 discusses fisheye lenses that show places nearby in great detail while showing the whole world, showing remote regions in successively less detail; a caricature is the poster of the New Yorker's View of the United States." Section 3 describes a degree of interest (DOI) function that assigns to each point in a structure, a number telling how interested the user is in seeing that point, given the current task. A display can then be made by showing the most interesting points, as indicated by the DOI function. The fisheye view can achieve, for example, a logarithmically compressed display of a tree, as illustrated by FIG. 4 of Furnas for a tree structured text file. Section 4 also describes fisheye views for botanical taxonomies, legal codes, text outlines, a decisions tree, a telephone area code directory, a corporate directory, and UNIX file hierarchy listings. Section 5 indicates that a display-relevant notion of a priori importance can be defined for lists, trees, acylic directed graphs, general graphs, and Euclidean spaces, unlike the geographical example which inspired the metaphor of the "New Yorker's View," the underlying structures need not be spatial, nor need the output be graphic. FIG. 6 of Furnas shows a fisheye calendar.

EP 0447 095A, Robertson, et al., entitled "Workspace Display", which is assigned to the assignee of the present invention discloses a processor which presents a sequence of images of a workspace that is stretched to enable the user to view a part of a workspace in greater detail. The workspace includes a middle section and two peripheral sections that meet the middle section on opposite edges. Each of the sections appears to be a rectangular two-dimensional surface and they are perceptible in three dimensions. When the user is viewing the middle section as if it were parallel to the display screen surface, each peripheral section appears to extend away from the user at an angle from the edge of the middle section so that the peripheral sections occupy relatively little of the screen. When the user requests stretching, the middle section is stretched and the peripheral sections are compressed to accommodate the stretching. When the user requests destretching, the middle section is destretched and the peripheral sections are decompressed accordingly.

SUMMARY OF THE INVENTION

A method and apparatus for increasing the displayed detail of a tree structure is described. The present invention is for use on a computer controlled display system and provides for visualization of a tree structure so that a greater amount of the detail of the tree structure may be displayed in a display area. In the present invention, a two-dimensional tree structure is warped about an arbitrary surface for display. Such an arbitrary surface would include a surface defined by a parabola, a hyperbola or a surface defined by the intersection of two lines. As a result, an increased number of nodes in each level of the tree can be displayed.

The method of the present invention is comprised generally of the steps of receiving the node-link information representing the tree structure; laying out the node-link information to create a tree structure in a two-dimensional plane; applying a warping function to the planar address of each node to create a display address and displaying the nodes of the tree at it's display address. The applied warping function will correspond to the surface about which the tree structure is warped.

DETAILED DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This application is related to co-pending application entitled "A Method and Apparatus for Visualization of A Tree Structure On A Three-Dimensional Surface", Ser. No. 08/282,123, and which is assigned to the assignee of the present application.

U.S. Pat. No. 5,333,254 entitled "Methods of Centering Nodes In A Hierarchical Display, which is assigned to the assignee of the present invention, is incorporated herein by reference. This reference discloses the display of a tree structure in two dimensions and the centering of a selected node along a centerline. The reference further discloses animation steps for scrolling of the tree for centering a node.

A method and apparatus for visualization of a tree structure with an increased number of nodes in a display area is described. In the following description numerous specific details are set forth, such as data models for representing a tree structure, in order to provide a thorough understanding of the present invention. It would be apparent, however, to one skilled in the art to practice the invention without such specific details. In other instances, specific implementation details such as the system calls for causing a tree structure to be displayed on a screen, have not been shown in detail in order not to unnecessarily obscure the present invention.

Hierarchically related information is often represented as a tree. As used herein, the term node will refer to a point on the tree structure. Each node includes pointers to a parent node and one or more child nodes to create the tree structure. A root node is the highest level node. Leaf nodes are the bottom level nodes.

When a tree structure becomes large, it may be difficult or even impossible to present the entire tree on a display area in full detail. Thus, it is desirable to place as much of the tree structure into a display area as possible.

It should be noted that a tree is in the general class of node-link structures. As will become apparent in the description below, the present invention could be implemented so as to support other node link structures.

Figure 1:
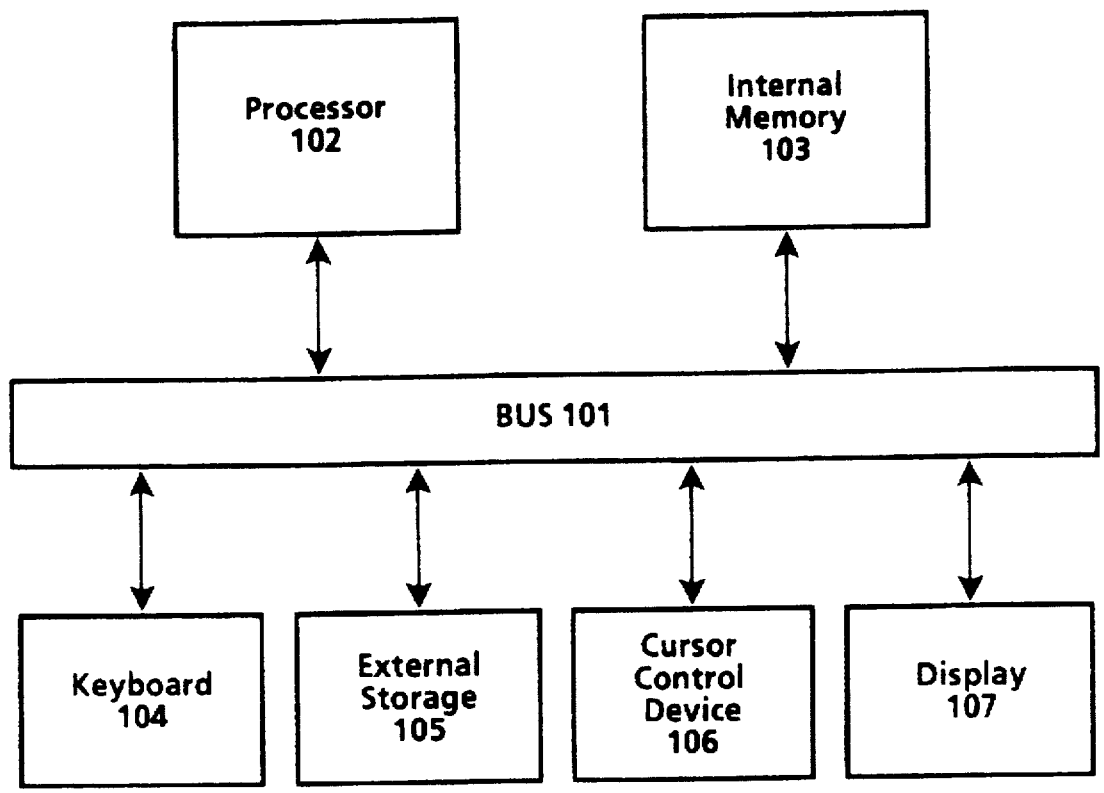
FIG. 1 is a block diagram of computer controlled display system in the currently preferred embodiment of the present invention.

Overview of a Computer Controlled Display System In the Currently Preferred Embodiment of the Present Invention The computer based system on which the currently preferred embodiment of the present invention may be implemented is described with reference to FIG. 1. Referring to FIG. 1, the computer based system is comprised of a plurality of components coupled via a bus 101. The bus 101 may consist of a plurality of parallel buses (e.g. address, data and status buses) as well as a hierarchy of buses (e.g. a processor bus, a local bus and an I/O bus). In any event, the computer system is further comprised of a processor 102 for executing instructions provided via bus 101 from Internal memory 103 (note that the Internal memory 103 is typically a combination of Random Access and Read Only Memories). The processor 102 will be used to perform various operations in support of creating the tree visualizations. Instructions for performing such operations are retrieved from Internal memory 103. Such operations that would be performed by the processor 102 are described with reference to FIGS. 5-6. The processor 102 and Internal memory 103 may be discrete components or a single integrated device such as an Application Specification Integrated Circuit (ASIC) chip.

Also coupled to the bus 101 are a keyboard 104 for entering alphanumeric input, external storage 105 for storing data, a cursor control device 106 for manipulating a cursor, and a display 107 for displaying visual output. The keyboard 104 would typically be a standard QWERTY keyboard but may also be telephone like keypad. The external storage 105 may be fixed or removable magnetic or optical disk drive. The cursor control device 106, e.g. a mouse or trackball, will typically have a button or switch associated with it to which the performance of certain functions can be programmed.

The currently preferred embodiment of the present invention has been implemented on a Silicon Graphics workstation with graphics facilities as described in *SGI Graphics Library Programming Guide*, Silicon Graphics, Inc. of Mountain View, Calif. The Silicon Graphics workstation provides for manipulating graphical objects in a three dimensional space. However, it would have been apparent to one of skill in the art to implement the present invention on other suitable computer systems providing graphical functionality which manipulate graphical objects in a two dimensional space. Such implementations would not depart from the spirit and scope of the present invention.

Overview of the Tree Visualization

Figure 2:
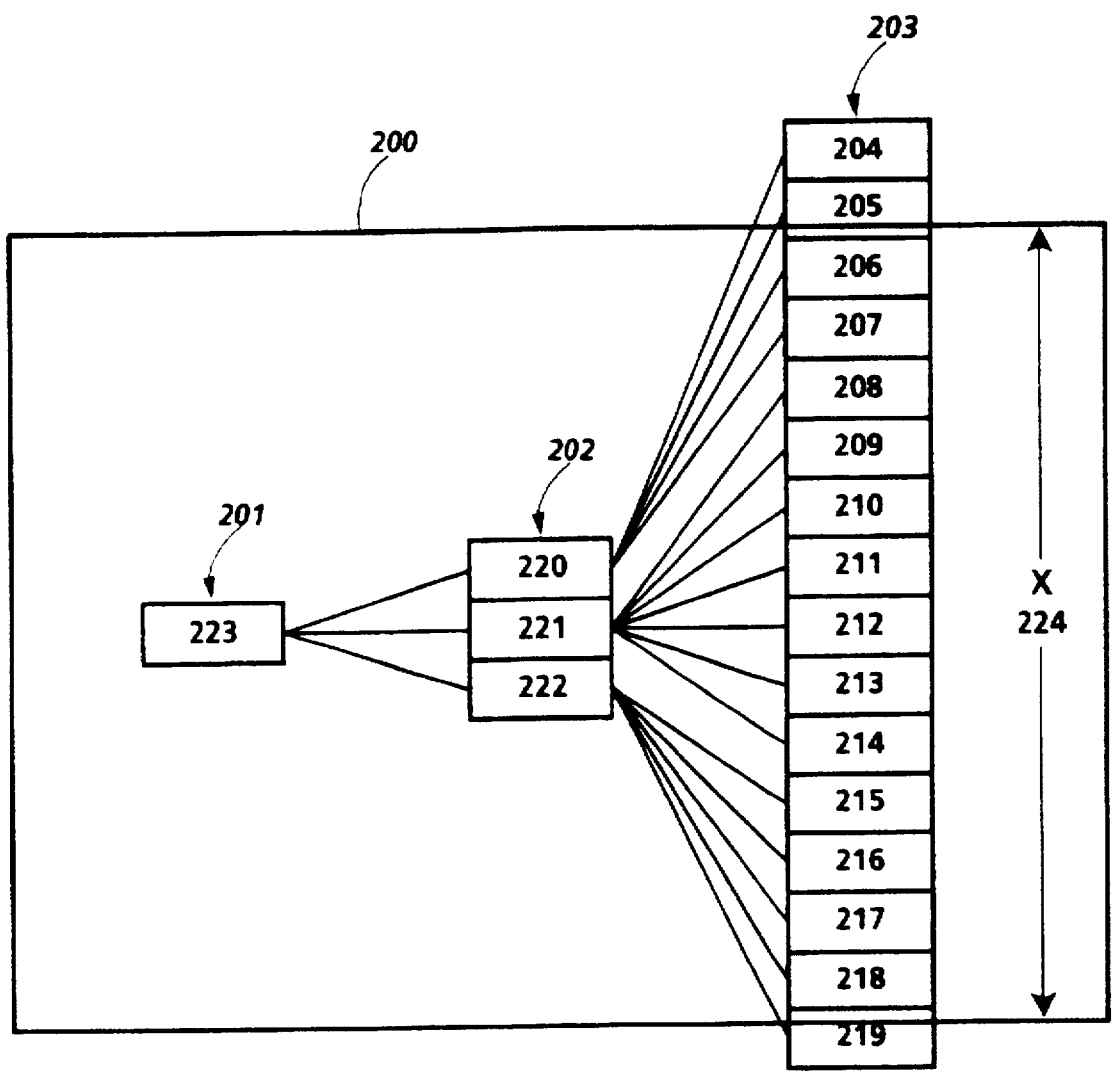
FIG. 2 illustrates a two dimensional tree structure as is known in the prior art.

FIG. 2 illustrates a visualization of tree structure laid out on a plane as is known in the prior art. Referring to FIG. 2, a tree structure comprised of levels 201, 202 and 203 is displayed in display area 200. Each of the levels 201-203 of the tree structure are aligned in a column. Level 201 is comprised of a single node (node 223) and level 202 is comprised of three nodes (nodes 220-222. ) Level 203 contains sixteen nodes (nodes 204-219). The nodes in level 203 exceed the entire height X 224 of display area 200. So for example, the nodes 204, 205 and 219 would not be completely displayed. Thus it is readily observed that the height X 224 of display area 202 accommodates a maximum number of complete nodes (here 13). As is known in the art, nodes which are above or below the display area may be scrolled in.

Figure 3:
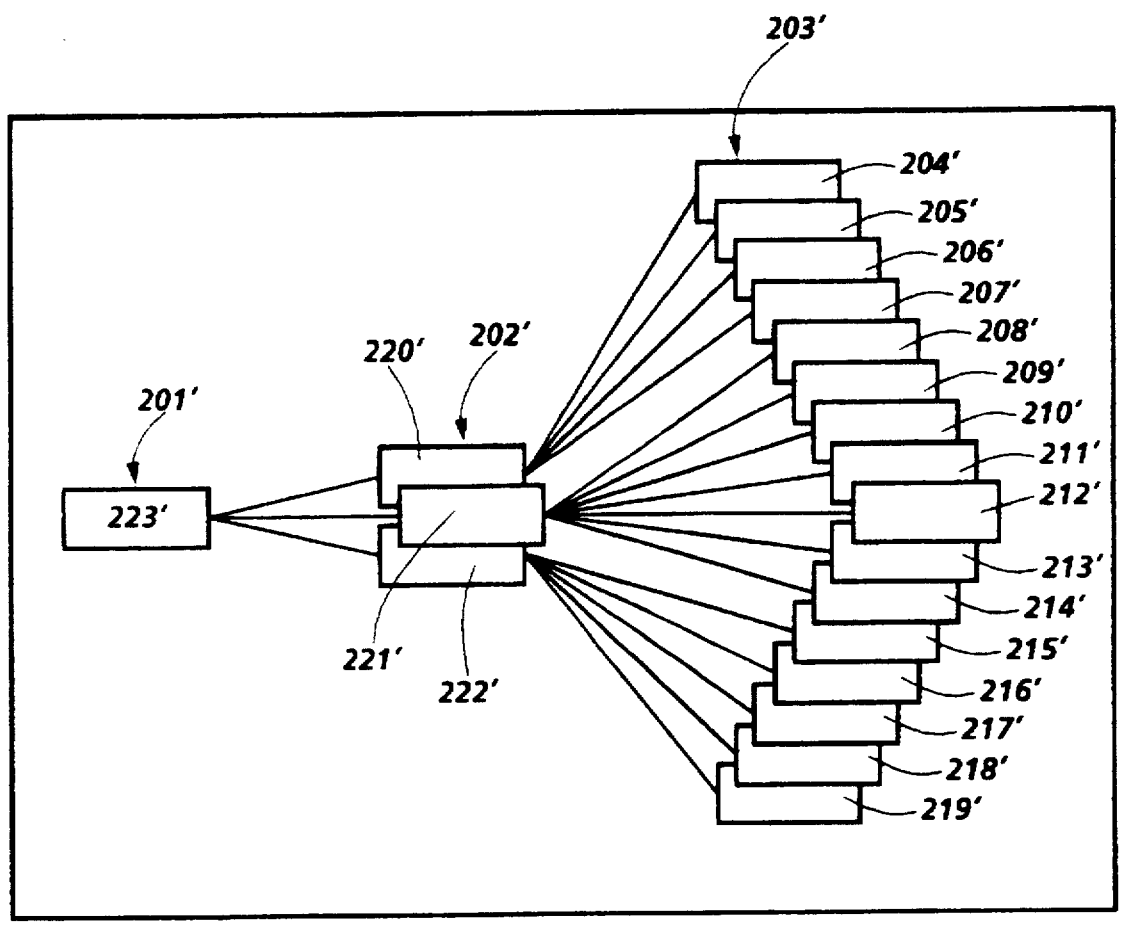
FIG. 3 illustrates the tree structure of FIG. 2 warped about an arbitrary surface.

FIG. 3 illustrates the tree structure of FIG. 2 warped about an arbitrary surface for display. As will be described below, the arbitrary surface provides a frame of reference for transforming a node's planar address to a "warped" display address. Referring to FIG. 3, it is readily observed that all sixteen nodes at level 3 (nodes 204'–219') are displayed at level 203'. Clearly, it would have been possible to display more than sixteen nodes. This is contrasted with the 13 nodes from level 203 of FIG. 2. Thus, given the same dimensions for a display area, more information is available using the warping of the present invention. It should further be noted that the nodes 220'–222' of level 202' are also displayed in a more compact manner. Further examples of warping to other surfaces are provided below in FIGS. 7–9.

Internal Representation of Node

Figures 4, 6:
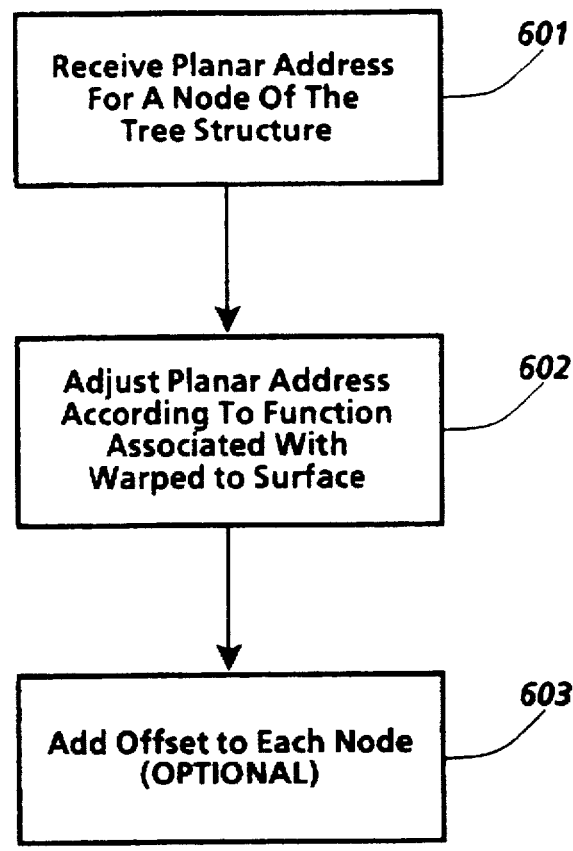
FIG. 4 is an illustration of a data structure for a node as may be utilized in the currently preferred embodiment of the present invention.
FIG. 6 is a flowchart of the steps for creating display addresses for nodes of the tree structure, i.e. warping the tree structure, as may be performed in the currently preferred embodiment of the present invention.

As noted above, a tree is an instantiation of a node-link structure. FIG. 4 illustrates a minimal data structure for a node in a tree structure in the currently preferred embodiment of the present invention. Other structures may be utilized which contain more or less information. Referring to FIG. 4, the structure is comprised of a plurality of pointers 401–402, node information 403 and a layout address for the node 404. The pointer 401 points to a parent node and the pointers 402 point to one or more child nodes. The pointers 401 and 402 are typical for a tree structure representation. The node information 403 may contain a label for the node to be used when it is displayed, or it may contain a pointer to such information. The layout address 404 contains the address for the node with respect to the plane as generated in the layout plane step described in FIG. 5. As will be described in greater detail below, the layout address 404 would subsequently contain the display address after the node is "warped."

Creating the Tree Visualization

Figure 5:
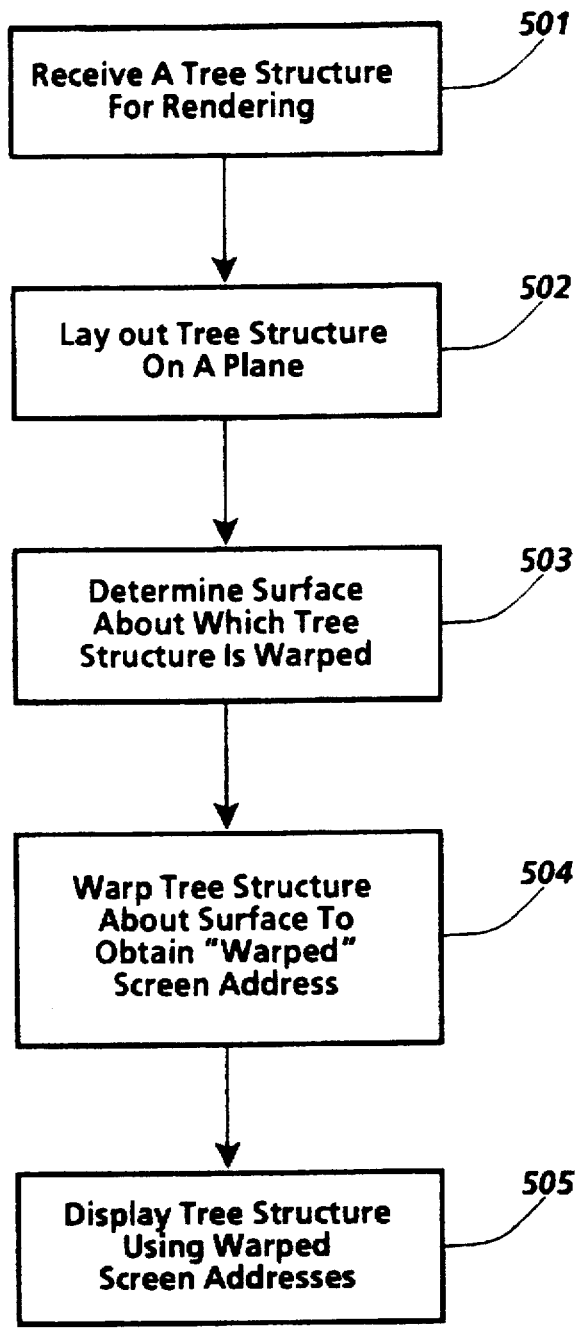
FIG. 5 is a flowchart of the general steps performed when creating the visualization of a tree structure in the currently preferred embodiment of the present invention.

The basic steps for creating the tree structure are described with references to the flowcharts of FIGS. 5 and 6. Referring to FIG. 5, a tree structure is received, step 501 and laid out onto a plane, step 502. Creation of a tree structure is beyond the scope of the present invention and various techniques for creating tree structures are known in the art. Moreover, the creation of tree structures often depends on the nature of the tree structure being created. Similarly, various techniques for laying out a tree structure on a plane are known in the art and could be used with the present invention. In the currently preferred embodiment of the present invention, a layout technique described in U.S. Pat. No. 5,333,254 is utilized.

Inherent in the underlying operation of the present invention is a step by which the surface to the tree structure is warped is determined, step 503. Preferably, this is done through a user specifying the desired shape via a menu. Alternatively, the surface could be automatically selected by the computer controlled display system according to some predetermined criteria relating to the size and shape of the tree structure. In any event, although exact timing is not critical, it must be done before the tree structure is warped.

Once the tree structure is laid out on a plane each node will have associated with it a plane address. This plane address may directly correspond to a screen address for display as illustrated by the prior art, or it may require some scaling in order for it to be displayed. In any event, the plane address is then warped with respect to the specified predetermined surface, step 504. This warping is conceptually analogous to bending the structure about the surface and creates a three-dimensional visual effect for the displayed portions of the tree structure. The result of this warping step is to provide new display addresses for each node of the tree structure. The warping step is described in greater detail with respect to FIG. 6. The tree structure is then displayed at the display address, step 505. In this display step, the tree structure is rendered by the computer controlled displays systems so that the nodes are displayed at their display address.

Note that the currently preferred embodiment utilizes techniques for scrolling as described in U.S. Pat. No. 5,333,254. Thus, no further description of how scrolling is performed is deemed necessary.

Referring now to FIG. 6, the "warping" step is described in greater detail. It should first be noted that the coordinate references described below are in units of inches. Referring to FIG. 6, a planar address for a node is received, step 601. Warping is effected with respect to a particular surface shape. In the currently preferred embodiment the shapes includes a parabola, hyperbola and an intersection of two lines. Each of the various shapes are defined by a particular function which is described in greater detail below. The received planar address is then adjusted according to the function corresponding to the shape the tree is being warped about, step 602. In the currently preferred embodiment, the X coordinate address corresponds to a column or level at which the particular node is at and will not change. Y and Z coordinates are determined using the function corresponding to the desired surface. Next, as an optional step, an offset may be added to the derived Y and Z addresses to control the "closeness" at which the tree structure appears to the viewer, step 603. The offset applied depends on the particular level at which the node is at. The effect of drawing the structure closer to the viewer, as expected, causes the tree and corresponding text to be larger. It has been determined experimentally that an offset equation of N×5 inches, where N is the level of the tree structure for the node, produces acceptable results.

Note that it would also be possible to implement the present invention so that the "warping" shape is different for each level of a tree structure or that warping only occurs at certain levels (e.g. when the number of nodes in a level exceeds a certain threshold.)

Warping Surfaces

As noted above, various warping surfaces may be utilized in the currently preferred embodiment of the present invention. Two-dimensional shape formulas for various warping surface types can be found in various references, e.g. "MATHEMATICAL TABLES FROM HANDBOOK OF CHEMISTRY AND PHYSICS ELEVENTH EDITION", Copyright 1959 by THE CHEMICAL RUBBER PUBLISHING COMPANY Cleveland, Ohio. Each of the shape formulas includes constants which define the actual end shape. Through experimentation, values for the constants have been determined which provide acceptable results. Generally, the horizontal coordinate for a node will remain fixed while the shape formula is used to find vertical and depth coordinates.

Figure 7:
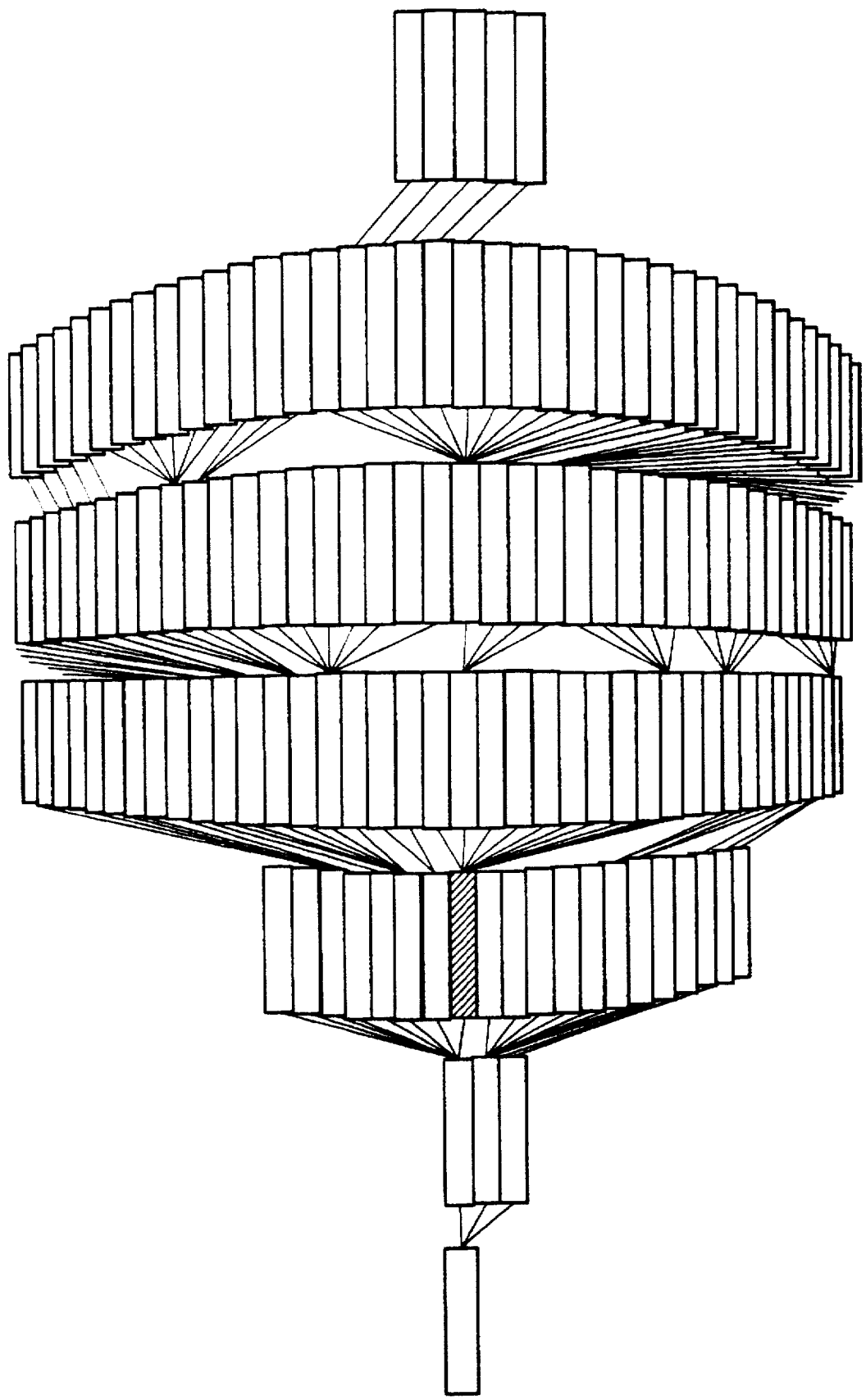
FIG. 7 illustrates the tree structure of FIG. 2 warped about a parabolic surface as created by the currently preferred embodiment of the present invention.

FIG. 7 illustrates a two-dimensional tree structure warped about a parabola which extends back in the Z direction. Via the steps described in FIGS. 5 and 6, each level of the tree structure is laid out along the parabola in the Y and Z coordinates. The X coordinate is unchanged from it's original planar address. The formula for deriving the Y and Z coordinates is $Y^{**}2=4fZ$, where f is a constant which defines the distance from the focus to the vertex. In the currently preferred embodiment, it has been experimentally determined that the constant f=10 inches provides acceptable results.

Figure 8:
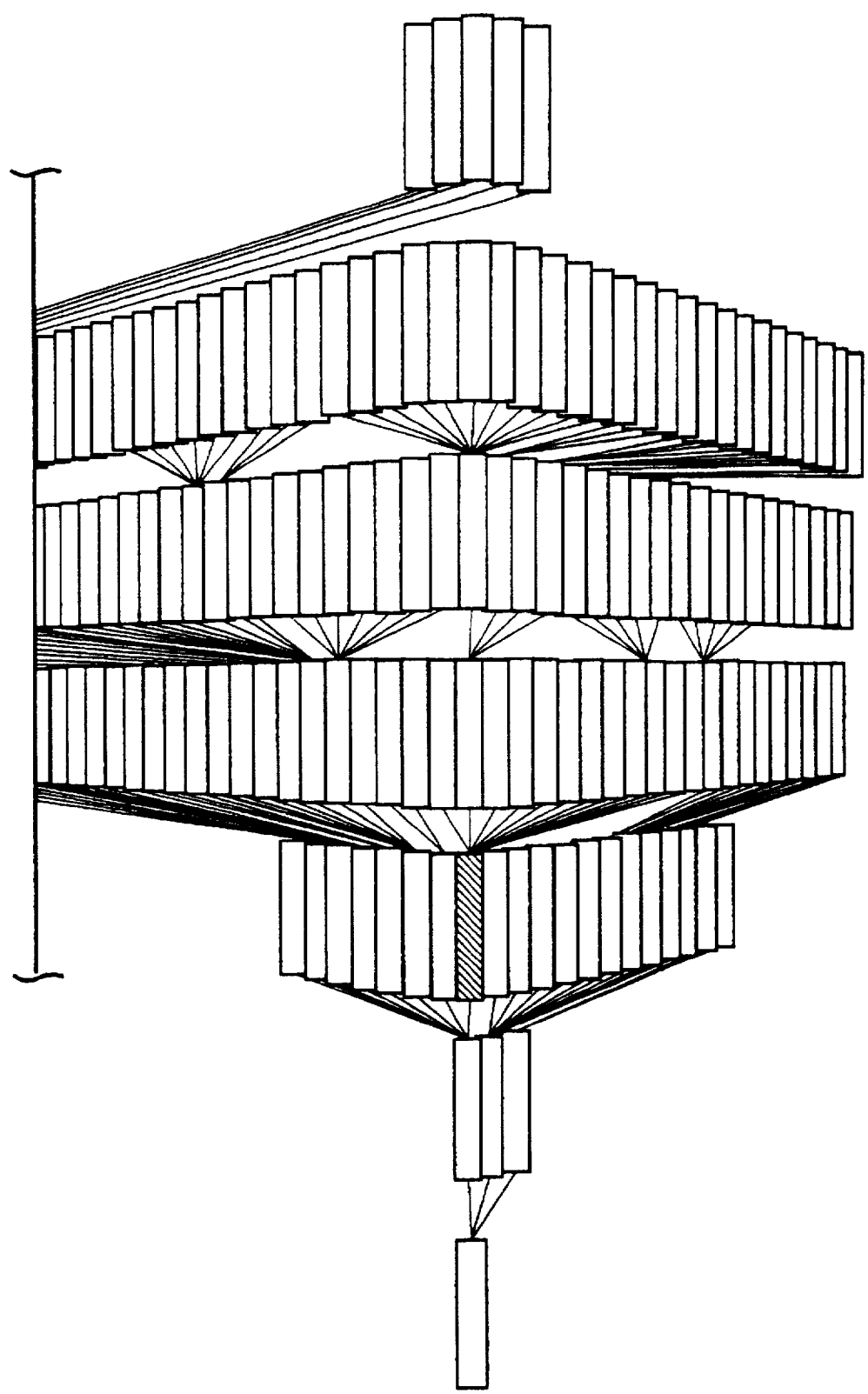
FIG. 8 illustrates the tree structure of FIG. 2 warped about a hyperbolic surface as created by the currently preferred embodiment of the present invention.

FIG. 8 illustrates a two-dimensional tree structure warped about a hyperbolic surface (actually half of a hyperbola). Again, the X coordinate remains unchanged. The formula for deriving the Y and Z coordinates is $Z^{}2/a^{}2-Y^{}2/b^{}2=1$ where a and b are constants defining the semi-axes of the hyperbola. It has been determined experimentally that values a=5 and b=7 provide acceptable results. It should be noted that this warping results in the bottom and top nodes being "closer" to the viewer and thus more readable.

Figure 9:
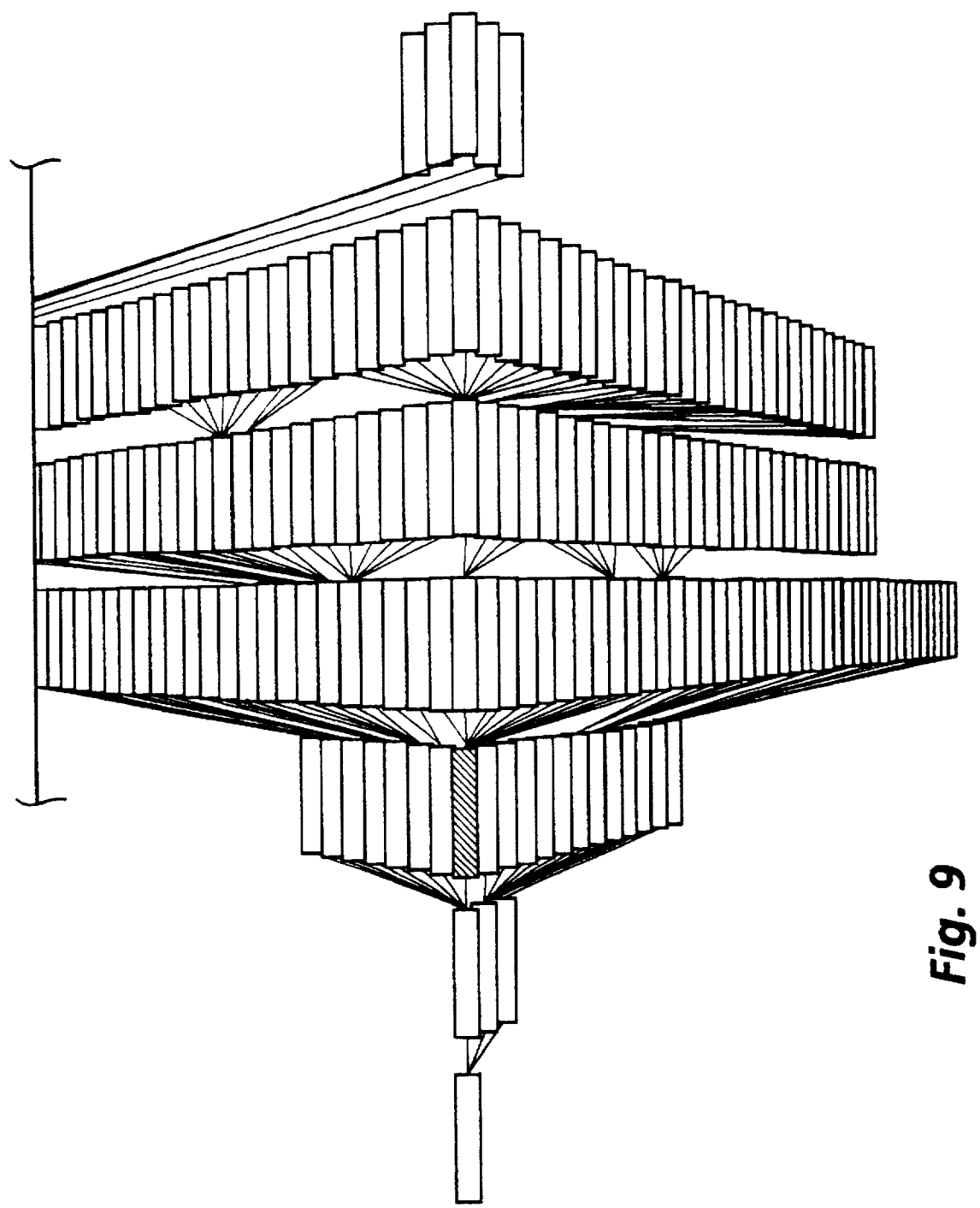
FIG. 9 illustrates the tree structure of FIG. 2 warped about a surface defined by two intersecting lines, as created by the currently preferred embodiment of the present invention.

FIG. 9 illustrates a surface defined by the intersection of two lines. Again, the X coordinate remains unchanged. The formula for deriving the Y and Z coordinates is he surface is defined by the equation z=−a|Y|, where a is a constant. This surface is particular advantageous because it is easy to compute. It has been determined experimentally that a=1.4 provides acceptable results.

Thus, a method and apparatus for increasing the displayed detail of a tree structure is disclosed. While the embodiments disclosed herein are preferred, it will be appreciate from this teaching that various alternative, modifications, variations or improvements therein may be made by those skilled in the art, which are intended to be encompassed by the following claims.

What is claimed:

1. A computer controlled display system for displaying three dimensional visualizations of hierarchically related information, said hierarchically related information comprised of a node link structure, said computer controlled display system comprising:
   a display for displaying said node-link structure on a viewing area of said display;
   receiving means for receiving a node-link structure, said node-link structure having multiple levels;
   layout means coupled to said receiving means, said layout means for creating planar addresses for each of said nodes in said node-link structure, said planar addresses representing a layout of said node link structure on a plane;
   warping means coupled to said layout means, said warping means for transforming said planar addresses into three dimensional display addresses using a surface function for each of a plurality of nodes in said node-link structure, said surface function corresponding to a surface shape;
   rendering means coupled to said warping means and said display, said rendering means for causing nodes in said node-link structure to be displayed in said viewing area of said display at said created three dimensional display addresses so that said entire node-link structure appears to be warped about said surface shape; and
   scrolling means coupled to said warping means, said scrolling means for causing scrolling of said node-link structure so that said node-link structure scrolls about said surface shape.

2. The computer controlled display system as recited in claim 1 wherein said warping means is further comprised of means for modifying said three dimensional display addresses for each of a plurality of nodes of said node-link structure so that said structure is perceived as closer to a viewer.

3. The computer controlled display system as recited in claim 2 wherein said means for modifying is comprised of offset adding means for adding an offset to said three dimensional display addresses based on the level of the node in the node-link structure.

4. The computer controlled display system as recited in claim 1 wherein said surface function is for a parabola.

5. The computer controlled display system as recited in claim 1 wherein said surface function is a hyperbola.

6. The computer controlled display system as recited in claim 1 wherein said surface function is a surface defined by two intersecting lines.

7. The computer controlled display system as recited in claim 1 further comprising means for selecting a surface about which said node-link structure will be warped from a set of surfaces, said set of surfaces including a hyperbola, a parabola and a surface defined by two intersecting lines.

8. A method for displaying a node-link structure in a three-dimensional visualization on a display, said method comprising the steps of:
   a) receiving a node-link structure, said node-link structure comprised of a plurality of nodes and levels;
   b) laying out said node-link structure on a plane to create a planar address for each of said plurality of nodes in said node-link structure;
   c) transforming the planar address of each node of said plurality of nodes in said node-link structure using a surface function to create a three dimensional display address, said surface function corresponding to a surface shape;
   d) displaying said nodes of said node-link structure at their corresponding three dimensional display address, wherein said entire node-link structure appears warped about said surface shape;
   e) receiving a request to scroll said node-link structure; and
   f) displaying an animation of scrolling said node-link structure by repeating step c)–d) for said transformed planar addresses for nodes in said node link structure so that said node-link structure appears to scroll about said surface shape.

9. The method as recited in claim 8 wherein said step of creating a three-dimensional spatial coordinate from a planar address is further comprised of the step of retaining a horizontal coordinate for said node in said node-link structure and creating vertical and depth coordinates from said surface function.

10. The method as recited in claim 8 wherein said surface function is an equation for a hyperbola.

11. The method as recited in claim 8 wherein said surface function is an equation for a parabola.

12. The method as recited in claim 8 wherein said surface function is an equation for a surface defined by two intersecting lines.

13. The method as recited in claim 8 wherein said step of adjusting the planar address of each node of said node-link structure using a surface function to create a display address is further comprised of the step of adding an offset to a node based on the node's level in the node-link structure, wherein said node-link structure is visually perceived as closer to a viewer.

14. In a computer controlled display system for controlling the display of a multi-level tree structure on a viewing area of a coupled display, said computer controlled display system having a processing means, internal memory, a cursor control device, a keyboard and external memory, said tree structure comprised of a plurality of nodes laid out on a planar surface wherein each of said plurality of nodes has a planar address, an improvement comprising:
   warping means for warping said tree structure about a surface so that an increased number of nodes of said tree structure are visible in said viewing area of said display, said warping means comprised of:
      means for receiving a planar address for a node of said tree structure;
      means for transforming said planar address for said node of said tree structure to create a three dimensional display address for said node using a surface function, said surface function corresponding to said surface; and scrolling means coupled to said warping means, said scrolling means for scrolling said tree structure about said surface.

15. The improvement as recited in claim 14 wherein said means for transforming said planar address is further comprised of means for modifying said three dimensional display addresses of said nodes of said tree structure so that said tree structure is perceived as closer to a viewer.

16. The improvement as recited in claim 15 wherein said means for modifying said display address of said nodes of said tree structure so that said tree structure is perceived as closer to a viewer is further comprised of means for adding a first offset to nodes at a first level of said tree structure and a second offset to nodes at a second level of said tree.

17. The improvement as recited in claim 14 wherein said surface function is for a parabola.

18. The improvement as recited in claim 14 wherein said surface function is for a hyperbola.

19. The improvement as recited in claim 14 wherein said surface function is for a surface defined by two intersecting lines.

20. The improvement as recited in claim 14 further comprising means for specifying the surface to which said tree structure is warped.

21. A method for displaying a node-link structure in a three-dimensional visualization on a display, said method comprising the steps of:
   a) receiving a node-link structure, said node-link structure comprised of a plurality of nodes and levels;
   b) laying out said node-link structure on a plane to create a planar address for each node in said node-link structure;
   c) transforming the planar address of each node of said plurality of nodes in said node-link structure using a surface function to create a three dimensional display address, said surface function corresponding to a static surface shape; and
   d) displaying said nodes of said node-link structure at their corresponding three dimensional display address, wherein said entire node-link structure appears warped about said static surface shape.

* * * * *